Dec. 2, 1952     K. K. LA POINT     2,619,777
PRESSURE REDUCING VALVE
Filed May 9, 1947
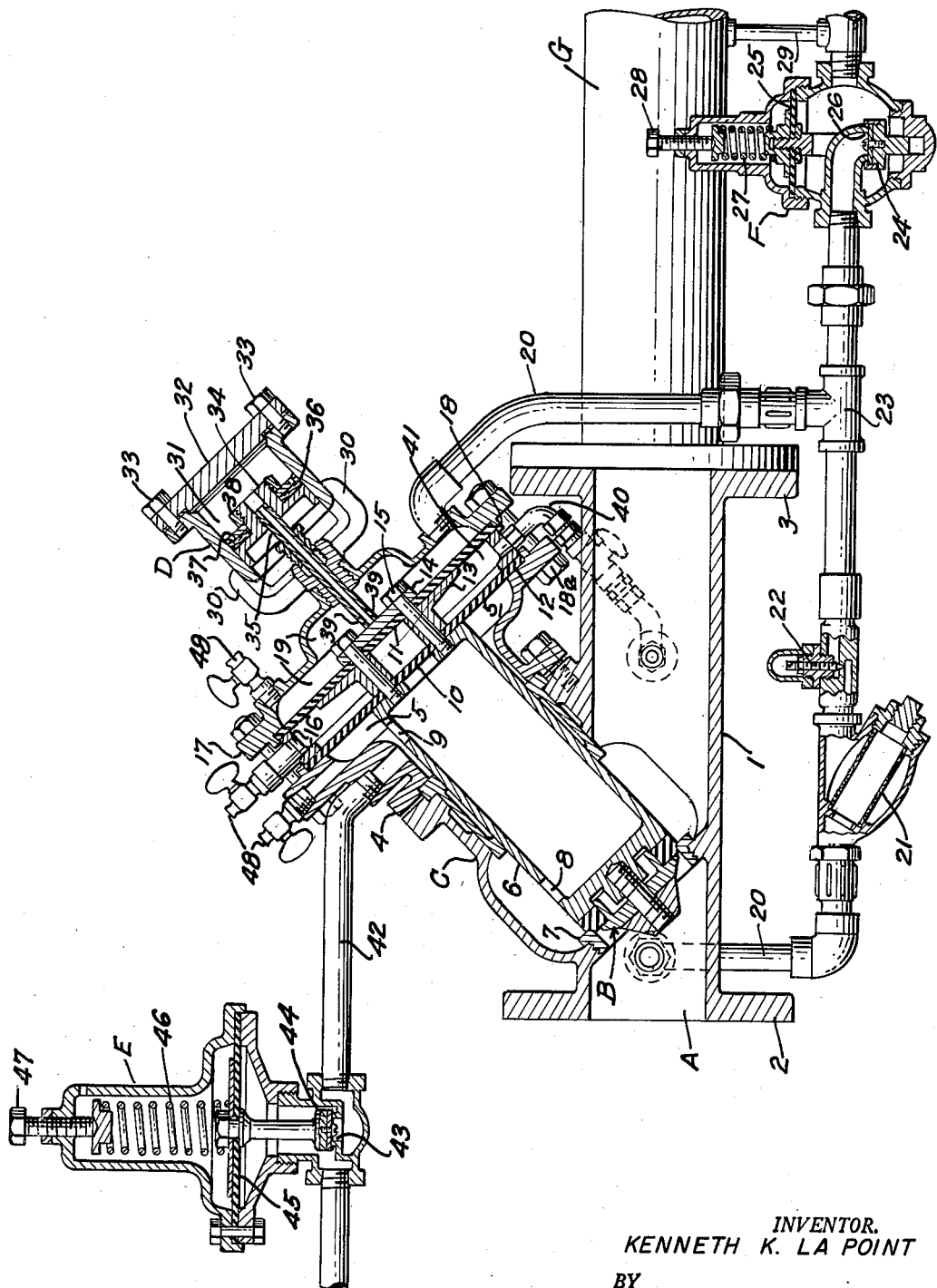
INVENTOR.
KENNETH K. LA POINT
BY
Thomas Castberg
ATTORNEY Patented Dec. 2, 1952

2,619,777

UNITED STATES PATENT OFFICE 2,619,777

PRESSURE REDUCING VALVE

Kenneth K. La Point, Albany, Calif., assignor to Charles M. Bailey Co., Inc., San Francisco, Calif., a corporation of California Application May 9, 1947, Serial No. 747,034

4 Claims. (Cl. 50—11)

This invention relates to a booster for an automatic pressure reducing valve.

The principal objects of the invention are to provide a valve that is positive in its action; a valve that will not stick or jam in use; a valve that will maintain a constant uniform reduced pressure regardless of variations in up-stream pressure or severe fluctuations in flow; a valve where a constant and positive reduced pressure may be maintained with practically no regulator maintenance.

The above and other objects will be apparent upon reading the specification and claims.

The invention is illustrated in the drawing, wherein the figure is a side elevation partially in section of the pressure reducing valve showing the connected pipe and the regulating valves employed therewith.

Referring to the drawing in detail, A indicates a high pressure inlet side of a valve; B the valve proper; C the valve housing; D a booster piston housing hereinafter to be more fully described; E a relief valve of usual type; F a regulator valve of ordinary construction; and, G a low pressure outlet pipe.

In the drawing 1 indicates a horizontal pipe member that has flanges 2 and 3 at its respective ends. Formed intermediate the ends of said pipe 1 is a cylindrically shaped valve housing C that extends upwardly from the pipe 1 at an angle of approximately forty-five degrees. Attached to the housing C is a second housing 4 that has a chamber 5 formed therein. Said housings C and 4 carry a piston 6. Piston 6 carries the valve B which seats on a valve seat 7. The piston B is hollow and has a port 8 at the lower end thereof in communication with the low pressure pipe G and a second port 9 at the upper end thereof in communication with the chamber 5. Thus low pressure water can flow from the pipe G through the port 8, the piston 6 and the port 9 to the chamber 5. Two diaphragms 10 and 11 are attached to the upper end of the piston 6. The diaphragm 10 is supported on an annular seat 12 formed in the upper end of the housing 4. A spacer 13 is placed between the two diaphragms 10 and 11 to hold said diaphragms in place and apart. A plate 14 is placed on top of the diaphragm 11 and bolts 15 pass through said plate 14, the diaphragm 11, the spacer 13 and the diaphragm 10 to secure them to the upper end of the piston 6. The peripheral edge of the diaphragm 10 is held on its seat 12 by an annular spacer ring 16. The diaphragm 11 is held in place by a head 17 that has an annular seat 18 formed therein to engage and secure the diaphragm 11. The housing 4 and the head 17 are bolted together by bolts 18a which secure the two diaphragms 10 and 11 and the spacer rings 16 to the housing 4. The head 17 has formed therein a high pressure chamber 19. A pipe 20 runs from the high pressure inlet side A of the valve to the chamber 19 to normally maintain high pressure on the upper face of the diaphragm 11. Intermediate the ends of said pipe are a strainer 21 and a needle valve 22. A T connection 23 connects pipe 20 to the regulator valve F. Said regulator valve F has a valve 24 that is connected to a diaphragm 25, said valve 24 being normally held in closed position against a valve seat 26 by the pressure of the water in the downstream pipe opposing a spring 27 that tends to open the valve 24, the tension on the spring 27 being controlled by a set screw 28. Forming a connection between the regulator valve F and the low pressure pipe G is a pipe 29. Attached to the head 17 by arms 30 is the booster piston housing D, said booster housing having formed therein a cylinder 31 which is closed by a head 32 held in place with bolts 33. The cylinder 31 contains a piston 34 which is connected to a tubular piston rod 35. This tubular piston rod 35 rests on the plate 14 which is attached to the diaphragms 10 and 11 so any pressure exerted on the piston 34 is transmitted to said diaphragms 10 and 11. The piston 34 has attached thereto a cup leather 36 and a cup spreader 37. These are fastened to the piston 34 by a nut 38. The under-side of the piston 34 is open to the atmosphere. The tubular piston rod 35 has ports 39 formed in the lower end thereof which permits high pressure fluid to flow from the chamber 19 through the ports 39 through the tubular piston rod 35 and into the cylinder 31 to increase the effective area of the high pressure diaphragm 11.

A pipe 40 connects the low pressure pipe G with a chamber 41 formed between the two diaphragms 10 and 11. Leading from the chamber 5 is a pipe 42 which connects with the relief valve E, said relief valve E having a valve seat 43, a diaphragm actuated valve 44 and a diaphragm 45. The valve 43 is normally held in a closed position by a spring 46, tension on said spring 46 being regulated by a set screw 47. Whenever the water pressure in the pipe G goes above the pressure set for the relief valve E, said valve 44 opens and water flows therethrough until the pressure in low pressure pipe G is reduced below the setting of the relief valve E. Each of the chambers 5, 19 and 41 have separate manually operated relief cocks 48.

In operation suppose, for example, that the reducing valve is used on a water line where the pressure of water in the high pressure inlet side of the valve is one hundred pounds and it is the desire of the user to maintain a pressure of fifty pounds on the low pressure outlet. The pressure on the valve B will accordingly be one hundred pounds. The water pressure in the pipe 20 will also be one hundred pounds, and as water under this pressure flows through the needle valve 22 to chamber 19, water under this pressure flows through the ports 39, the tubular piston rod 35 and therefore exerts a pressure of one hundred pounds on the piston 34 as well as the diaphragm 11. The pressure exerted on diaphragm 11 and the piston 34 is sufficient to force the valve B downwardly on its seat 7, keeping the valve B closed. This is true because the pressure area of the piston 34 acts as a booster to the pressure area exerted by the area of the diaphragm 11. This pressure of one hundred pounds is exerted over a greater area than the counter pressure area, namely that exerted on the valve B, which is a hundred pounds, and that on the diaphragm 10, which is fifty pounds.

When the water pressure in the low pressure pipe G falls below fifty pounds, or whatever pressure is set on the valve 24 by the spring 27, then the water pressure on the under side of the diaphragm 25 of the valve 24 is not sufficient to overcome the force of the spring 27 in said regulator valve F, and said spring 27 forces the valve 24 downwardly and away from its seat 26 permitting water under pressure in the pipe 20, chamber 19 and cylinder 31 to flow through said main regulator valve and the pipe 29 into the low pressure pipe G. This is true because the needle valve 22 restricts the flow of water therethrough and water is rapidly drained through pipe 20 from the chamber 19 and cylinder 31. This reduces the pressure on the piston 34 and the diaphragm 11. This reduction of pressure on the piston 34 and the diaphragm 11 results in the pressure on the valve B becoming greater than that exerted on said diaphragm 11 and piston 34, and valve B is forced open permitting the high pressure water in the pipe A to flow directly into the low pressure pipe G until a pressure is built up in said low pressure pipe G sufficient to close the valve 24 in the regulator F. Then high pressure water flowing through the pipe 20, the needle valve 22, into the chamber 19 through the ports 39, the hollow piston rod 35, into the cylinder 31, will build up a sufficient high pressure on the piston 34 and the diaphragm 11 to overcome the force of the water pressure exerted against valve B. This is due to the greater pressure area of said piston 34 and diaphragm 11, and causes said valve B to close against the seat 7. It has been found that the pressure area or surface area upon which high pressure is exerted is critical in causing the valve B to move in one direction or the other. Thus employment of the booster piston 34 to increase the pressure exerted on the diaphragm 11 makes this device more positive in its action.

The pressure of the water in chamber 41 is always that that is found in the low pressure pipe G. This, in operation, smoothes the operation of the diaphragms and stops chattering and also stops the diaphragm 11 from being distorted by the high pressure exerted thereon in chamber 19.

It must also be remembered that the chamber 5 has connected thereto a pipe 42 and relief valve E. Therefore, there is at all times a definite control of the pressure of the water in the outlet pipe G for if water pressure in pipe G exceeds that set in relief valve E, water will flow from pipe G through ports 8 and 9 of piston B, chamber 5, pipe 42 and through said relief valve E until the pressure in pipe G is sufficiently reduced to permit valve E to close.

An important feature of the present invention is the booster piston 34; it should be noted that one side is exposed to a high pressure, for example one hundred pounds, while the other side, only to atmospheric pressure, hence the effective area of the booster piston 34 is much greater than any proportional area of the diaphragm 11 because said diaphragm 11 is at all times subject to a counter pressure of, for example, fifty pounds, or whatever pressure is in the pipe G.

It has been found that in actual practice great difficulty has been encountered in getting an ordinary pressure reducing valve to function properly when fluid under pressure is first delivered to the line as there is a tendency at that time to build up equal pressure on both the inlet and discharge sides. When this occurs and the pressures are equalized, the valve has a tendency to remain in open position and it is difficult, if not impossible, to get the valve closed. By the use of the booster piston herein described, this difficulty is overcome. The additional pressure area afforded by the piston 34 is sufficient to overcome the equalized pressure on both sides of the diaphragms 10 and 11 and thus forces the valve B to seat. By using a device of the character described, this serious problem arising at the time of initial use is satisfactorily overcome. If all pressures are balanced in all parts of the main regulator valve, then the pressure exerted on the booster piston 34 will be sufficient to positively force valve B to close. This is true because the pressure area of the booster piston 34 is added to the pressure area of diaphragm 11 causing an unbalancing of the pressure in a sufficient amount to close the valve B.

From the above description it will be seen that this device is simple in construction and positive in action.

While I have more or less specifically described and illustrated the preferred construction of the device, it should be understood that changes may be resorted to within the scope of the appended claims and that the materials and finish of the several parts employed may be such as the experience or judgment of the manufacturer may dictate or varying conditions or uses may demand.

Having thus described my invention, what I claim and desire to secure by Letters Patent is:

1. A valve of the character described comprising a housing having an inlet and discharge connection, a valve seat intermediate said connections, a diaphragm actuated valve normally engaging said valve seat, means for maintaining inlet high pressure on one side of said diaphragm to normally maintain the valve closed, means for maintaining a lower discharge pressure on the other side of the diaphragm, means for automatically reducing the pressure on the high pressure side of the diaphragm when pressure on the discharge side of the valve drops below a predetermined pressure, a cylinder disposed adjacent the high pressure side of the diaphragm, a piston mounted in said cylinder, a rod connecting said piston with the high pressure side of said diaphragm, and means for supplying fluid from an inlet side of the housing to actuate the piston, said piston being open to the atmosphere on one side thereof.

2. A valve of the character described comprising a housing having an inlet and discharge connection, a valve seat intermediate said connections, a diaphragm actuated valve normally engaging said valve seat, means for maintaining inlet high pressure on one side of the diaphragm to normally maintain the valve closed, means for maintaining a lower discharge pressure on the other side of the diaphragm, a cylinder disposed adjacent the high pressure side of the diaphragm, a piston mounted in said cylinder, a rod connecting said piston with the high pressure side of said diaphragm, means for supplying fluid from the inlet side of the housing to actuate the piston, said piston being open to the atmosphere on one side thereof, and means for automatically reducing the pressure on the high pressure side of the diaphragm and the pressure side of the piston when pressure on the discharge side of the valve drops below a predetermined pressure.

3. In a valve structure of the character described comprising a valve chamber, a valve disposed therein, pressure responsive means operable to actuate said valve, means communicating pressure from the high pressure side of said valve to said pressure responsive means to move said valve in one direction, and means communicating pressure from the low pressure side of said valve to said pressure responsive means to move said valve in the opposite direction, the improvement which comprises a booster piston, a chamber within which said piston is reciprocable, said piston being open to a low pressure on one side thereof, means operatively connecting said piston and said valve to permit the piston to aid in closing the valve, and means communicating the pressure on the high pressure side of said valve with said piston.

4. In a valve structure of the character described comprising a valve chamber, a valve disposed therein, a diaphragm operable to actuate said valve, means communicating pressure from the high pressure side of said valve to one side of said diaphragm to close said valve, and means communicating pressure from the low pressure side of said valve to the opposite side of said diaphragm, the improvement which comprises a booster piston, a chamber within which said piston is reciprocable, said piston being open to the atmosphere on one side thereof, means operatively connecting said piston with said diaphragm such that fluid pressure on said piston tends to close said valve, and means communicating the pressure on the high-pressure side of said valve with said piston.

KENNETH K. LA POINT.

REFERENCES CITED

The following references are of record in the file of this patent:

UNITED STATES PATENTS

| Number | Name | Date |
|---|---|---|
| 285,883 | Fisher | Oct. 2, 1883 |
| 825,866 | Rogers | July 10, 1906 |
| 2,098,696 | Sparrow | Nov. 9, 1937 |
| 2,116,046 | Schmitz | May 3, 1938 |